Figure 1:
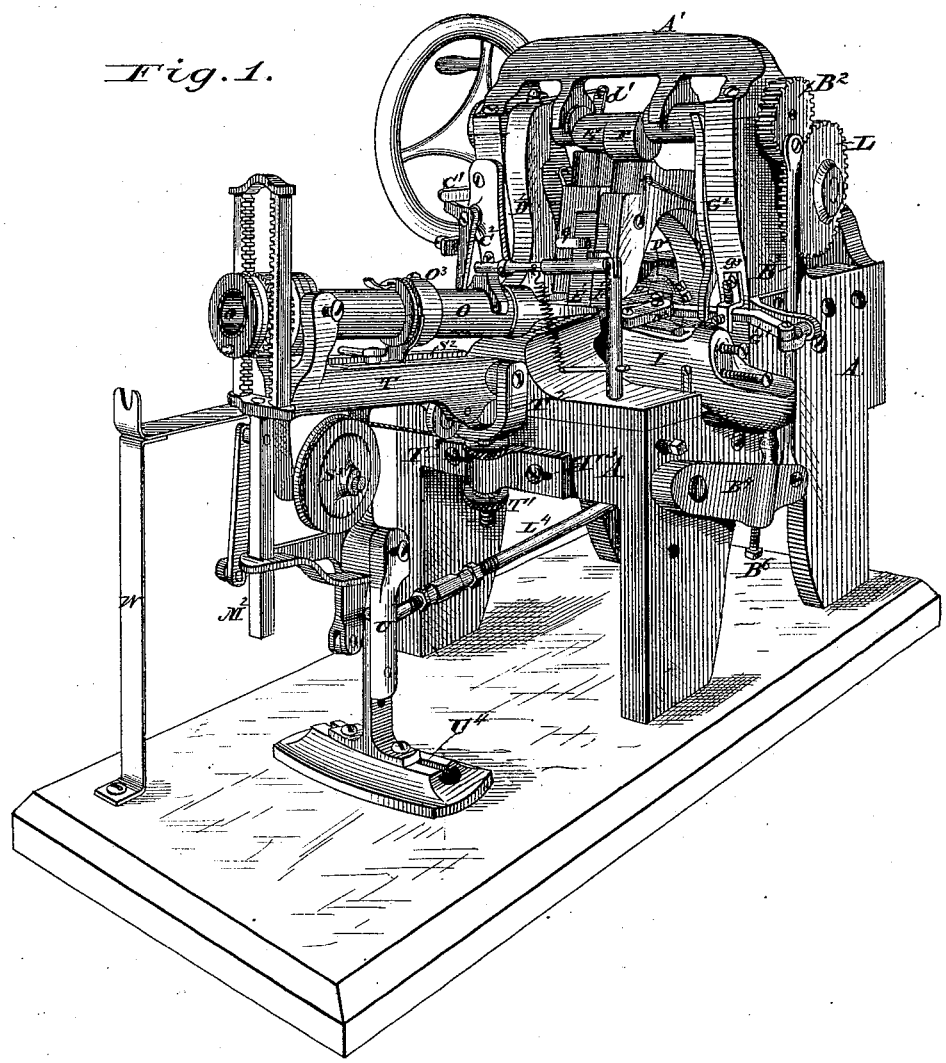

8 Sheets—Sheet 1.

J. A. BIDWELL.
Cut-Nail Machine.

No. 196,869. Patented Nov. 6, 1877.

Attest:
H. L. Perrine
A. W. Bright

Inventor.
J. A. Bidwell
By. Leggett & Leggett
Attorney.

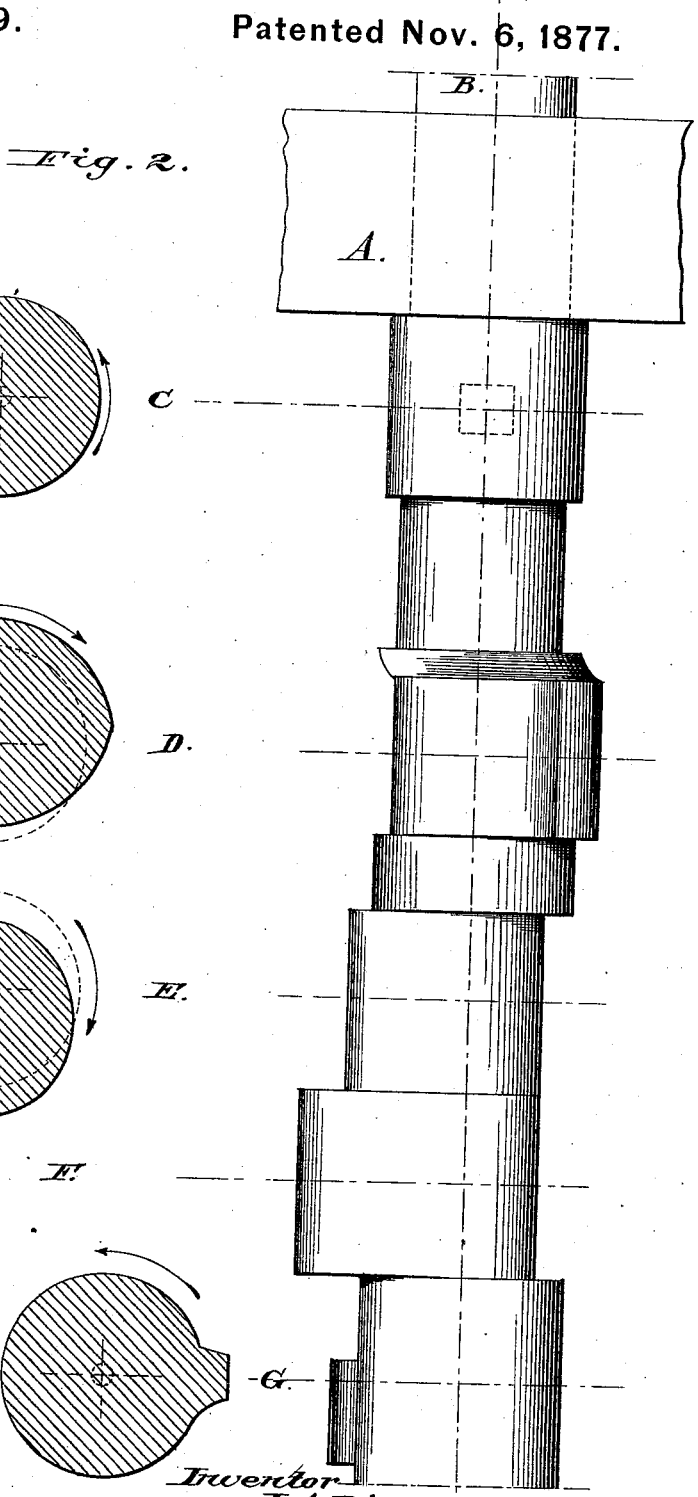

J. A. BIDWELL.
Cut-Nail Machine.
No. 196,869. Patented Nov. 6, 1877.
8 Sheets—Sheet 3.
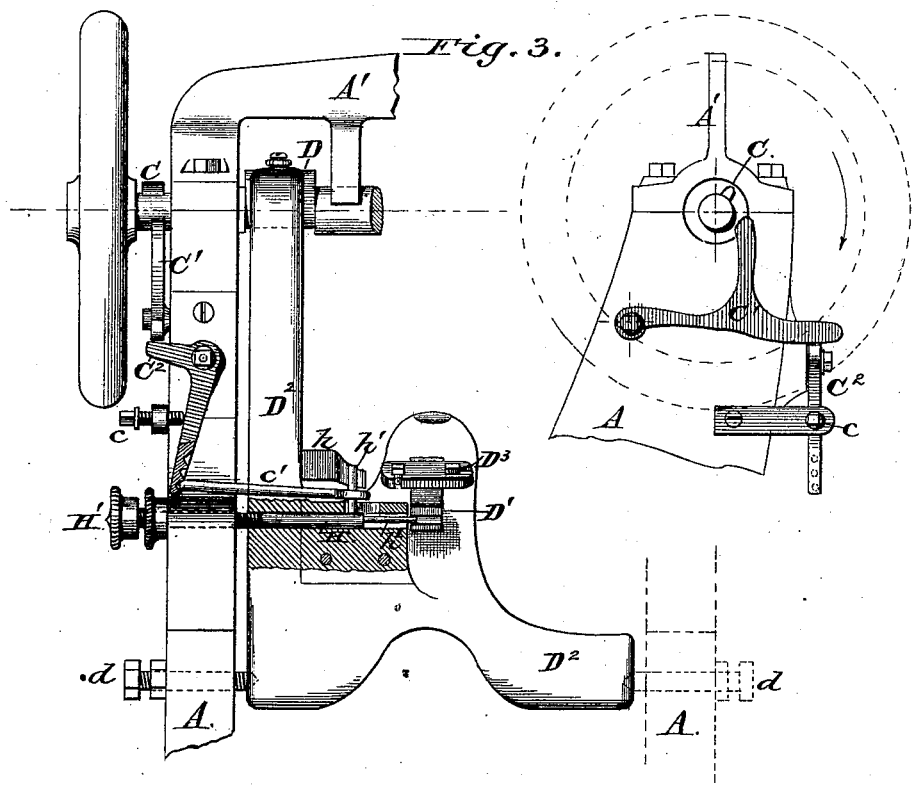
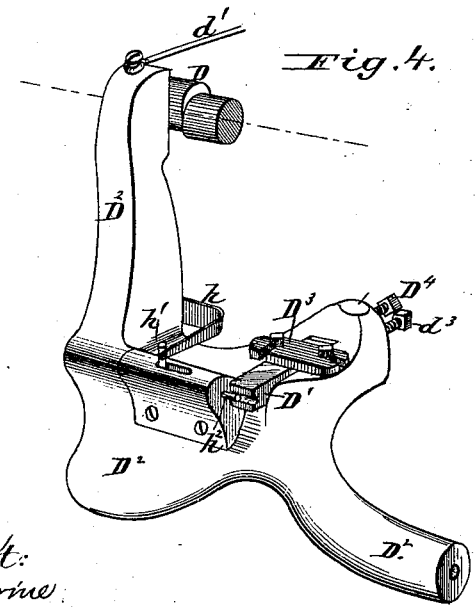
Attest:
H. L. Perrine
A. Bright
Inventor.
J. A. Bidwell.
By Leggett and Leggett.
Attorney.

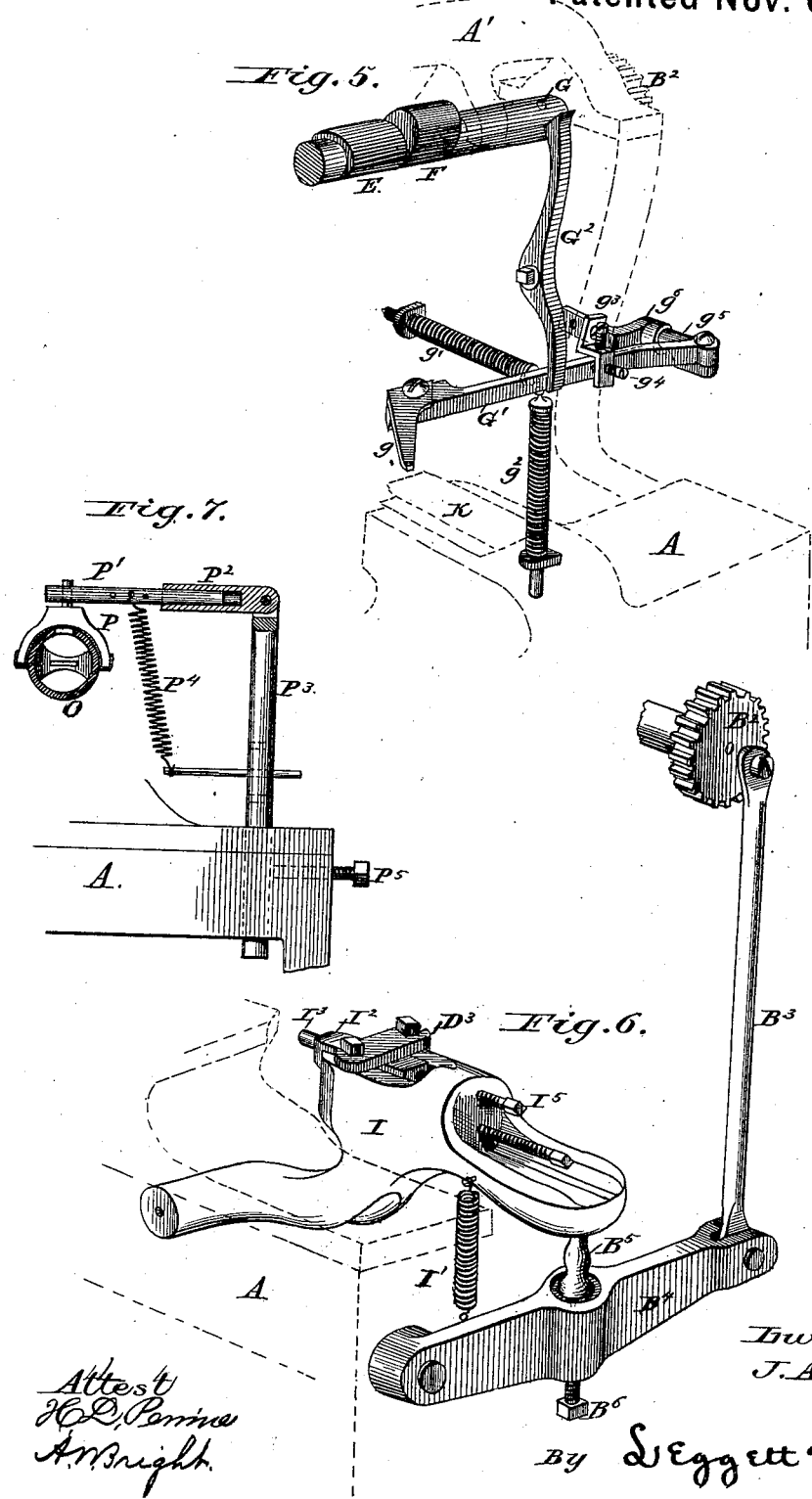

8 Sheets—Sheet 5.
J. A. BIDWELL.
Cut-Nail Machine.
No. 196,869. Patented Nov. 6, 1877.
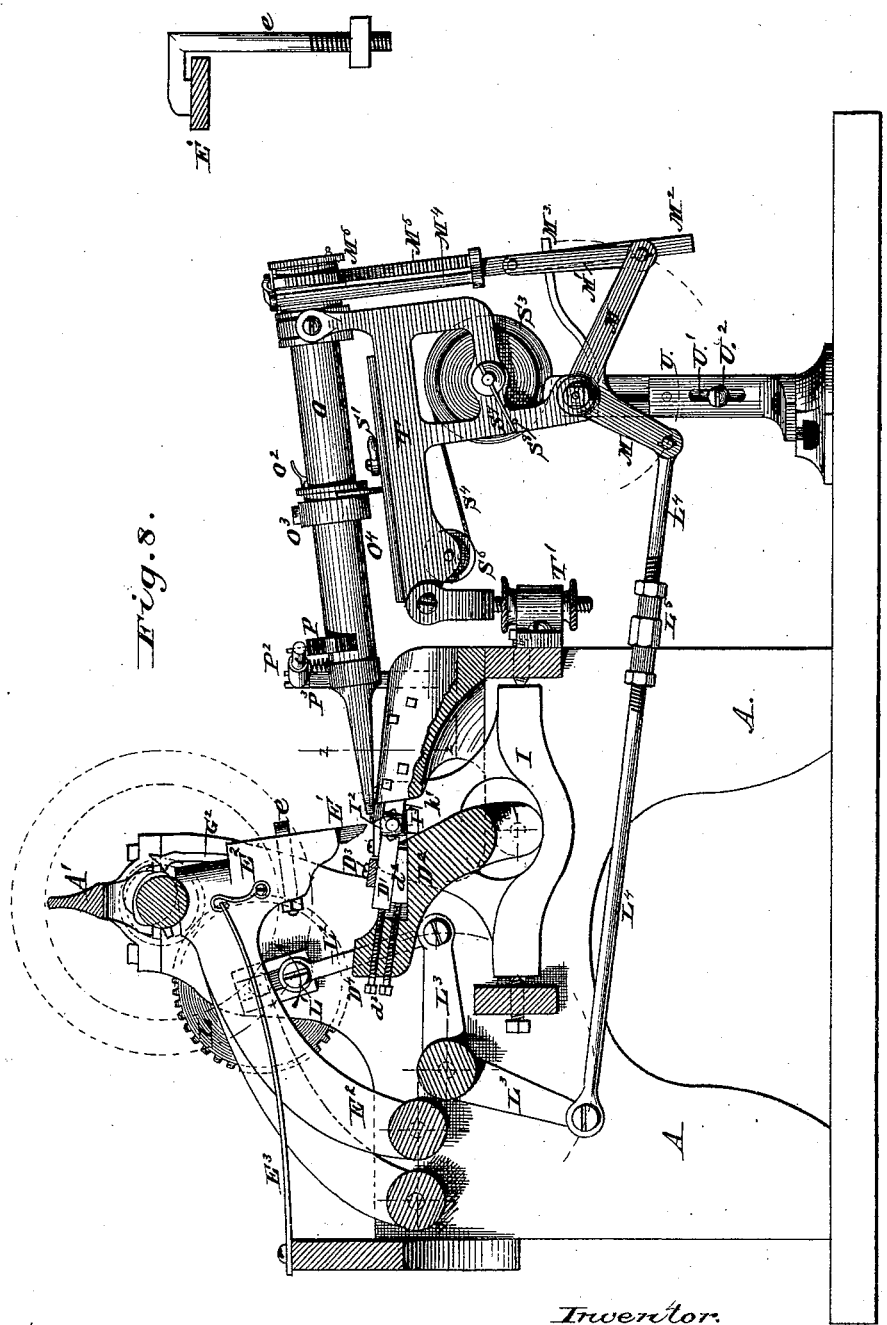
Attest:
H. L. Perrine
A. Bright
Inventor.
J. A. Bidwell
By. Leggett and Leggett
Attorney.

J. A. BIDWELL.
Cut-Nail Machine.
No. 196,869. Patented Nov. 6, 1877.
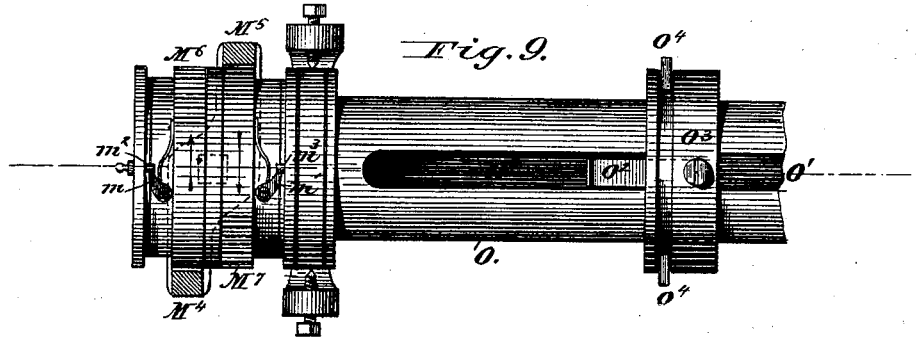
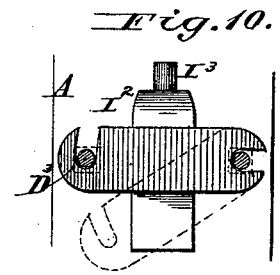
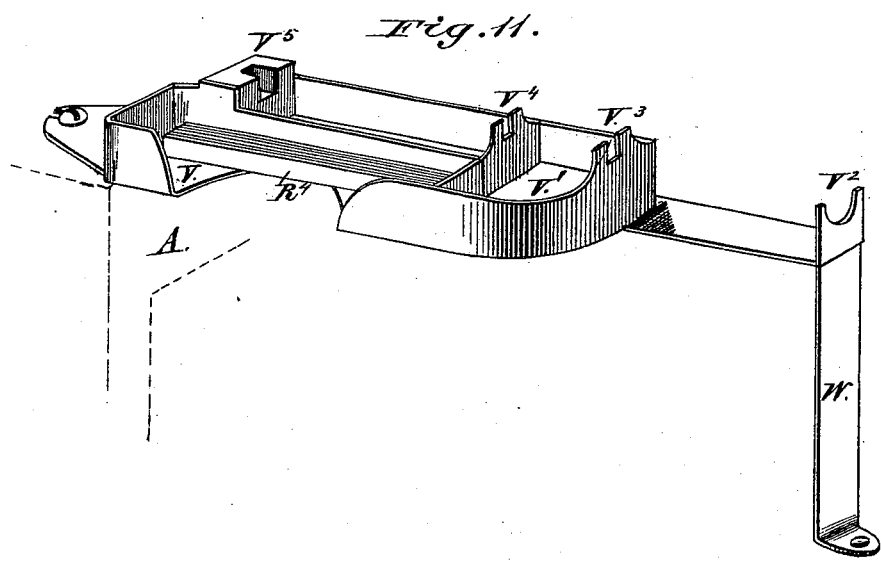

J. A. BIDWELL.
Cut-Nail Machine.
No. 196,869. Patented Nov. 6, 1877.
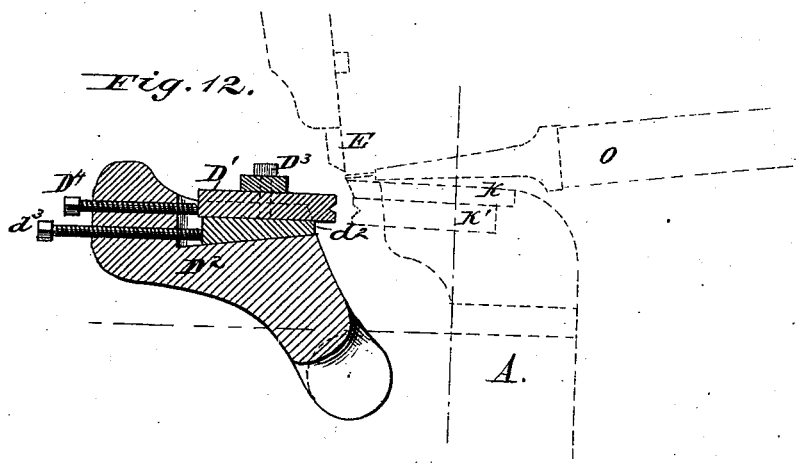
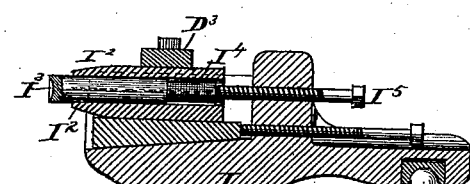
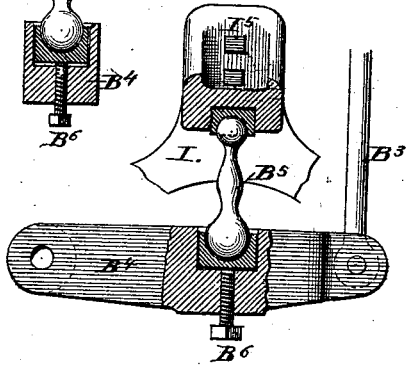
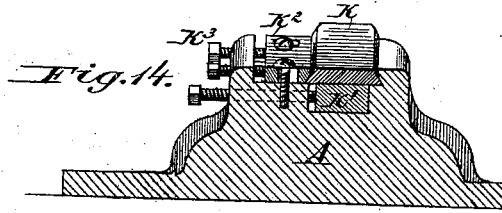

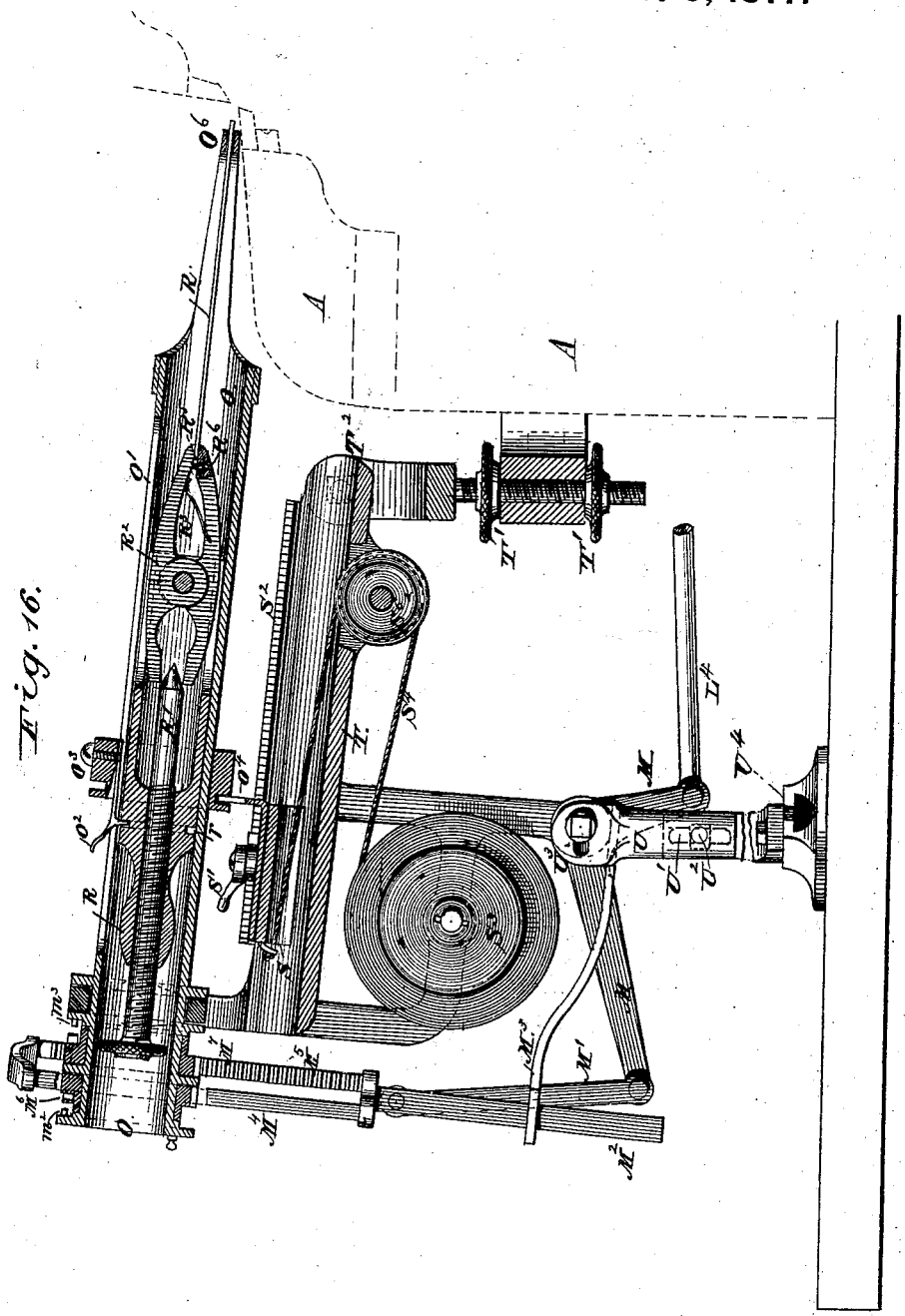

UNITED STATES PATENT OFFICE.

JASON A. BIDWELL, OF CLEVELAND, OHIO.

IMPROVEMENT IN CUT-NAIL MACHINES.

Specification forming part of Letters Patent No. 196,869, dated November 6, 1877; application filed March 24, 1877.

*To all whom it may concern:*

Be it known that I, JASON A. BIDWELL, of Cleveland, in the county of Cuyahoga and State of Ohio, have invented certain new and useful Improvements in Machine for Making Tacks, Nails, &c.; and I do hereby declare the following to be a full, clear, and exact description of the invention, such as will enable others skilled in the art to which it pertains to make and use it, reference being had to the accompanying drawings, which form part of this specification.

My invention relates to machinery for making tacks, nails, screw-blanks, and the like, and is susceptible of being adapted to the manufacture of these different products by a mere change of the dies, as will hereinafter more fully and at large appear.

In the drawings, Figure 1 represents an isometric view of a machine carrying my invention, said view taken from the front and looking upon the right-hand side of the machine. Fig. 2 represents a view, in side elevation, of the main shaft, also a view, in cross-section, of each of its cams, showing their shape and relative position to each other, while the main shaft is at a fixed point, and while the machine is in the act of cutting a blank from the plate. The dot in the cross-section of this figure indicates the center or axis of the shaft. The dotted circular line represents the body of the shaft, the solid line the eccentric. Fig. 3 is a detached view of the discharging mechanism and its connected parts up to the main shaft. Fig. 4 is a similar view of the body-die; Fig. 5, a similar view of the finger-bar; Fig. 6, a similar view of the hammer or heading mechanism. Fig. 7 is a detached view of the presser operating upon the feed-barrel. Fig. 8 is a view showing the connection between the main shaft and the feeding mechanism. Fig. 9 is a detached view of the annular gear-rings for rotating the feed-barrel. Fig. 10 is a detached view of the locking-plate used upon the movable die and heading-die, the dotted lines in this figure showing the manner of removing said plate. Fig. 11 is a detached view of the device for holding extra plates and the extra pincher and scraps or uncut ends of plates. Fig. 12 is a view, in longitudinal section, of the moving body-die. Fig. 13 is a longitudinal section of the hammer or heading-die. Fig. 14 is a cross-section of the stationary or bed die. Fig. 15 is a longitudinal section of the toggle and the parts which it connects. This figure also shows the adjustable journal, whereby the degree of throw accomplished by the toggle is determined. Fig. 16 is a longitudinal section of the feed-barrel and its contained pincher.

My invention consists of the following parts and combinations, as hereinafter specified and claimed, wherein—

A is the main frame, of suitable dimensions, fashion, and material, to hold and accommodate the action of the various elements of my machine. $A^1$ is a peculiar brace or arch extending over the machine from side to side, which serves as a resistance to the spreading of the frame, and also as a support to all upward pressure upon the main driving-shaft B. By the provision of this brace or arch $A^1$ the machine is materially stiffened and strengthened against liability to breakage during the operation of the machine.

To the main shaft B power for driving the machine is applied, and from said main shaft the entire machine is operated. Along this shaft are placed five cams—the cam C operating the delivering mechanism, the cam D operating the swinging or body die, the cam E operating the body-knife, the cam F operating the head-knife and partially the finger, cam G operating the finger-bar.

I will now proceed to describe the various parts operated by the cams just mentioned.

C is a short cam, consequently quick in its motion. It operates the bell-crank $C^1$. This bell-crank $C^1$, in turn, operates a second bell-crank, $C^2$, set at right angles to the bell-crank $C^1$. The bell-crank $C^2$ is limited in its return-movement by a set-screw, *c*, or its equivalent. To the long arm of the bell-crank $C^2$ is attached a link or pitman, *c'*, which connects said bell-crank with the discharging mechanism. The degree of motion imparted to the discharger by the bell-crank $C^2$ is regulated by an adjusting device, whereby the length of the long arm of the bell-crank $C^2$ is varied.

In the present instance, as one of several modes which might be adopted, I provide several recesses in the long arm of the bell-crank $C^2$, into any one of which may be placed one end of the link or pitman $c'$. As this link is placed farther toward the extremity of the long arm on the bell-crank $C^2$, a longer throw will be given to the discharger, and vice versa. A spring, $h$, or its equivalent, operates to return the discharger after it has operated; and, by its connection through the link or pitman $c'$ and the bell-crank $C^2$, it will be observed that the bell-crank $C^1$ is always held in proper juxtaposition to the main shaft and its cam C.

The discharging mechanism is contained in the carriage of the swinging or movable body-die, and may be described as follows: The projecting lug or pin $h^1$ extends outside of the carriage containing the discharging apparatus, and upon this pin operates the link or pitman $c'$ and the returning-spring $h$. This pin $h^1$ is attached to the carrier H, which rests in the end of the movable die and extends through its carriage, and is made to abut against a set-screw, $H^1$. To the end of the carrier H, opposite the set-screw $H^1$, in the case of a tack-machine, are attached two springs, which, when free, spread apart, so as to remain in juxtaposition with both the movable and stationary body-dies, and thus present one or the other against the finished tack, as it may adhere to either the stationary or movable die. When the dies are brought together these springs are closed, and are so placed as to offer no obstruction or impediment to the proper operation of the dies or machine.

In case the machine is used for manufacturing nails, screw-blanks, bolts, or the like, then these springs $h^2$ are substituted by a small bar, and this bar attached to the carrier, abutting, as it does, against the set-screw $H^1$, acts as an anvil to support the body while the head is being formed by the hammer or heading-die.

In the case of manufacturing tacks, it is obvious that such an anvil-support is not necessary, inasmuch as the tapering or bevel form of the tack, held snugly in the dies, as it is when the head is formed, dispenses with the necessity of any anvil or supporting device. The particular conformation of the body will prevent it from being driven longitudinally through the dies when the head is being formed. But in the case of a nail-bolt or screw-blank, there is not sufficient tapering to prevent its being driven longitudinally through the dies by the action of the heading device, and therefore in such case the springs $h^2$ are replaced by a simple pin or bolt, that shall abut against the pin or bracket $H^1$, and thereby serve as an anvil or support while the head is being formed. This change from the spring to the simple pin or bolt may be made as necessity requires without affecting in any way the spirit of my invention; and it is obvious that one may be substituted for the other in the cases and for the reasons above mentioned.

As the cam C is brought into operation against the bell-crank $C^1$ the discharger will be driven forward, and will operate to free the finished product of the machine from the dies, to which it may have adhered, thereby making room for the next succeeding blank.

The cam D operates the movable body-die $D^1$. This die is carried in a swinging lever, $D^2$, which also serves as a carriage for said die. This lever is one of the second order, with its pivot or fulcrum upon the main frame at $d$, its weight at the die, and its power at the cam D. It contains and carries the discharging apparatus and the movable die, and is returned from its operative position and held in proper juxtaposition against its cam D by a suitable connection with a spring, $d^1$, or its equivalent.

I will now describe the movable die and its accompanying apparatus. This die, as heretofore stated, is contained in and carried by the swinging carriage $D^2$; and, as heretofore declared, the character of this die may be modified, as it is desired to manufacture tacks, nails, bolts, screw-blanks, or other products, the only alteration required being merely in the conformation of the die itself.

It is necessary that the face of the die $D^1$ should rest against the face of its opposite or stationary die snugly, accurately opposing and fitting against it, as the body of the tack or other product would be imperfect otherwise. To accomplish this I make the die $D^1$ adjustable to its opposite or stationary die in two ways: first, so that it shall present at a proper level with the said die; and, second, so that it shall come into proper contact with it.

This adjustment I accomplish as follows: Beneath the die $D^1$ is placed a wedge, $d^2$, resting upon a counter-bevel seat, so that the upper face of the wedge shall be presented in a line parallel with the axes or direction of the die proper. Upon the level face of this wedge rests the die $D^1$. This wedge is made movable, and by its movement upon its counter-bevel seat the die $D^1$, resting upon it, will be raised or lowered.

The wedge $d^2$ is manipulated by means of the adjusting-screw $d^3$ or its equivalent.

Instead of the wedge apparatus just mentioned, a modification might be had by counter-beveling the under surfaces of the die $D^1$, so that the connection between the die and wedge would be the same as between the wedge and its counterbeveled seat just mentioned—to wit, the raising or lowering of the die as the wedge is moved in one direction or the other. By this means the up and down position of the die is adjustable, and the set-screw $D^4$ determines the forward and backward position of the die $D^1$; and by means of this set-screw, or its equivalent, said die is brought sufficiently forward to fit snugly against its fellow or stationary die. When the die $D^1$ is properly adjusted it is clamped firmly in position by the piece $D^3$. This locking-piece is provided with two slots, made at an angle to each other, preferably at right angle. Clamping-screws or their equivalents enter these slots, by the tightening of which the locking-plate $D^3$ is brought down firmly upon the die $D^1$, holding it rigidly in proper position.

By the arrangement of slots heretofore mentioned, the locking-plate $D^3$ is made readily removable by simply loosening the clamps or screws, it not being necessary to remove the set-screws or clamps.

The cam E operates the body-knife $E^1$. This knife is fixed upon a lever, $E^2$, pivoted to the main frame. A spring, $E^3$, or its equivalent, operates to return the lever after the knife $E^1$ has operated, and also serves to hold the lever $E^2$ properly against its cam E.

I prefer the connection here shown between the spring $E^3$ and the carriage $E^2$, which consists of a link-connection between the two.

The knife $E^1$ is formed of a single broad flat piece, and is held in position in its carriage by the clamp-hook $e$. This clamp-hook is so constructed as to provide a broad, flat bearing upon the central portion of the body-knife $E^1$, and when it is secured by turning the nut upon the rear of said hook-clamp the knife is held firmly in position, so that "cocking" is impossible.

Cam F operates the head-knife $F^1$, and also partially operates the finger. This knife, like its neighboring knife $E^1$, is fixed and carried in a similar lever, pivoted to the frame as the lever $E^2$, and provided with a spring constructed and acting the same as the spring $E^3$ above specified. This knife is also of a similar character, in general construction, to the knife $E^1$, and, like said knife, is held in position by a clamp-hook, which affords a broad, flat bearing upon the central portion of its face. The cam F operates to carry the knife $F^1$ farther down than the knife E is carried, and thus extra motion is imparted to the finger, in a manner and for a purpose which will hereinafter be noticed.

The cam G is a short or quick cam, whose office is to operate the finger-bar $G^1$. This it does by impinging upon a lever, $G^2$, of the first order, whereby a retreating movement is imparted to the finger $g$. When the cam G has finished its operation the finger $g$ and its finger-bar $G^1$ are returned to the former position by the action of a spring, $g^1$. The finger $g$ is made adjustable upon its finger-bar by a slot and bolts. This slot may be made either at the butt-end of the finger or in the finger-bar, where it is attached, and a set-screw fixes it in any adjusted position. The finger-bar $G^1$ has also a downward motion in addition to its retreating motion. This downward motion is imparted by the pressure of the head-knife $F^1$, and when released from this pressure it is returned to its former position by an upward pushing of the spring $g^2$.

The finger-bar $G^1$ is made adjustable in two directions—to wit, its upward throw, and its approach toward the stationary or bed knife. This adjustment is accomplished by two set-screws, $g^3$ $g^4$, or their equivalents. The finger-bar $G^1$ swings upon a journal and has a double movement, one at right angles to the other—one horizontal, and the other vertical. This is accomplished by a bracket, $g^6$, attached to the frame A, which allows of a vertical rotating movement to its contained coupler $g^5$. To this coupler the finger-bar $G^1$ is attached, and is permitted a horizontal vibratory movement. Thus is said finger-bar allowed the double movement just mentioned—to wit, the vertical and horizontal.

The finger-bar $G^1$ is hung and adjusted so that it shall swing on a center nearly coinciding with the axis of the hammer or heading device, so as to allow the finger $g$ to be carried down in the arc of a circle to the center of the dies, or to a position where said dies receive the blank held between the head-knife $F^1$ and the finger $g$. Upon the end of the main shaft B, beyond the cam G, is fixed the gear-wheel $B^2$. Upon the gear-wheel $B^2$ is a crank-pin, to which is attached the link $B^3$, connecting the wheel $B^2$ and lever $B^4$. This lever is one of the second order, and is operated from said gear-wheel $B^2$ by means of the link $B^3$. Its fulcrum or pivot is upon the main frame, and it is designed to operate the hammer or heading mechanism. The connection between the lever $B^4$ and said heading mechanism is by the toggle $B^5$, having spherical end bearings, and operating in journal-recesses made in the upper face of the lever $B^4$ and the lower face of the hammer or heading-carriage.

To provide for the wear incident to this style of connection beween the lever $B^4$ and the hammer or heading-carrier just mentioned, an adjustable spherical journal or bearing is provided in the lever $B^4$ for the piece $B^5$. This bearing is made adjustable up and down through the set-screw $B^6$, where lost motion can always be readily taken up, and thus accommodation made for wear. Not only does this set-screw $B^6$, in raising and lowering the spherical journal-box, operate to take up lost motion, as just described, but it also performs another important function—to wit, adjusting the throw of the hammer-carrier in such manner that, when the lever $B^4$ shall have reached its maximum up motion, the hammer shall be presented squarely and properly against the blank in the dies to be headed.

Proceeding to a description of the hammer or heading-carrier I and its contained parts, attention is first directed to the carrier itself. It is essentially a lever of the second order. Its pivot or fulcrum is upon the main frame, its weight is the hammer, and its power is received through the piece $B^5$.

After the hammer-carriage has completed its operation whereby the hammer is brought into action, it is returned by force of the spring $I^1$ until again brought forward for a succeeding stroke of the hammer. The hammer is held between two clamping-blocks, $I^2$, the two forming what may be termed the "hammer-socket." This socket contains the hammer proper I³ and hammer-butt I⁴. The hammer-butt is tempered, and may be a trifle smaller in diameter than the hammer proper. By this means, when the blocks T² are brought firmly together, the hammer shall be firmly clamped and held in position. The hammer-butt I⁴ is provided merely for the purpose of affording an interposing substance between the dies and adjusting-screw I⁵. The hammer-piece I³ is made flat upon one end, and concave, conical, or otherwise upon its other end; or a variety of hammer-pieces I³ may be provided, the fashion of whose ends shall determine the shape of the head of the product to be manufactured. If the head is to be flat, as in the case of an ordinary tack, then a flat-headed hammer-head, I³, is used; if a round-headed tack is to be made, a hammer-head having a concave face; if in the case of a bolt, any shape may be given to the heading-die. The hammer I³ descends to give the required shape to the bolt-head, and this, it is evident, may be infinitely varied as occasion may require without any call for inventive ingenuity.

The manner of fixing the hammer or heading device in its carriage, and the manner of its adjustment, are like that heretofore described and represented by the letters D¹ D² D³ d¹ d² d³ d⁴, all of which refer to the movable body-die D¹ and its accompanying parts, whereby it is fixed and adjusted. The wedge arrangement is the same, the locking the same, and the set-screws perform a similar office. A set-screw is provided that shall operate the wedge heretofore described, whereby the hammer I³ shall be raised or lowered, and thus be brought to a proper level with the center of the end of the blank to be headed; and the other set-screw above it determines the forward movement of the hammer, so that it shall approach more or less near the body-dies, and thus produce a thicker or thinner head to the product to be manufactured. If the set-screw is so adjusted as to permit a shorter throw of the hammer a thicker head will be produced, and vice versa.

In order to remove the hammer for repairs, all that it is necessary to do is to remove its locking-piece, corresponding to the locking-piece D³ heretofore mentioned, and the hammer-socket I² and its contained part can be readily lifted out without disturbing any of the neighboring parts.

Coming now to a description of the bed-knife K, it will be observed that this knife is a simple flat piece, beveled upon its two edges. This knife is made of a width sufficient to cut the required blank, and is placed in such relation to the knives E¹ F¹ that a shearing cut is given to the plate from which the blanks are severed. The bevel sides of the bed-knife K fit into counter-bevels, and these beveled surfaces operate, when the knife is clamped in position, to hold said knife firmly down in its place, and at the same time hold the stationary die firmly in place. This bed-knife lies over the bed-die K¹. This die is fixed and stationary, and to this die the movable or swing die D¹ and the hammer I³ are made adjustable, as hereinbefore specified.

On one side of the bed-knife K is a movable and adjustable gib, K². By means of this gib, whose counter-bevel is made to fit the bevel side of the knife K, said knife is clamped and held in position, and this is accomplished by screws K³ or their equivalent, whereby the gib K² is forced against the knife K, and thereby holds it firmly in position.

When necessary to remove the knife for the purpose of repair or substitution, or to get at the stationary die K¹, it is only necessary to loosen the gib K², when the necessary parts may be readily removed without material disturbance, or without removing the nose-piece of the plate-feeder.

The gib K² is provided with slots, through which its attaching-screws pass, by which a side motion of said gib is allowed for tightening or loosening the knife K.

I come now to a description of the plate-feeding mechanism. This mechanism is primarily actuated from the gear-wheel B², which meshes into the gear-wheel L, journaled in the main frame A. The wheel B² bears the proportion to wheel L of one to two. Its shaft passes through said main frame, and upon the inner end of it is attached a crank, L¹. This crank has an adjustable pin, whereby is governed the length of throw given to the lever L³. This lever is pivoted into the main frame, and has two arms, being essentially a bell-crank. One arm receives its motion from the pitman L², which motion is transmitted by the other arm of the crank L³ to the feeding mechanism through the connecting-bar L⁴. Along this bar is provided the expanding-screw L⁵, which is a nut having two opposing female screws working upon the broken bar L⁴, by the turning of which nut L⁵ one way or the other the bar L⁴ is lengthened or shortened for the purpose of giving the desired throw to the parts to which it is connected. This bar L⁴ connects the bell-crank lever L³ with bell-crank lever M of the feeding mechanism. The bell-crank M imparts a reciprocating motion through the link M¹ to the bar M². This bar moves in a suitable guide, M³, and carries two opposing racks, M⁴ M⁵, which mesh into two loose annular gear-rings, M⁶ M⁷, fitted upon the barrel O. The annular gear-rings M⁶ M⁷ move in opposite directions to each other, as the racks M⁴ M⁵ travel up and down. Each of these annular gear-rings M⁶ M⁷ carries a spring-pawl, passing in the direction which it is desired that the nose-piece should turn; and upon the feeding-barrel is placed two lugs, $m^2$ $m^3$, which act as ratchets to the pawls $m$ $m^1$.

By this arrangement it will be seen that each of the annular gear-rings M⁶ M⁷ moves idly in a backward direction until its pawl has passed the lug or ratchet M² M³.

To impart a forward or return movement, one or the other of the pawls $m$ $m^1$ engages with lug $m^2$ or $m^3$, thereby giving an intermittent rotary motion, always in the same direction, to the feeding-barrel O and its contained plate.

The barrel O has a slot, $O^1$, provided along nearly its entire length, for the accommodation of the spring-latch $O^2$. This spring-latch is fixed to a ring, $O^3$, encircling the barrel O. In this ring is an annular groove, into which fits the fork-carrier $O^4$. This arrangement allows of a free rotation of the ring $O^3$ and the barrel O. The latch $O^2$ has upon its under surface a lug or catch, which engages in an annular groove made in the body of the pincher, the function of which arrangement will hereinafter be specified.

Near the nose-piece end of the barrel O is provided the presser P. This presser acts simply to hold the nose-piece down upon the bed-knife K, and prevent any jumping or undue upward movement of the nose-piece or barrel, while at the same time this pressure is not rigid, but gentle and elastic, and at the same time allows of a free side or lateral movement to the barrel and its nose-piece. This presser P is carried upon the end of the bar $P^1$, which telescopes into the tube $P^2$. This tube is pivoted to and swings from the post $P^3$. A spring-connection is made between the post and the bar $P^1$ by means of the spring $P^4$ or its equivalent, and this spring acts to hold the presser down with sufficient force upon the barrel O. The post $P^3$ is set into the main frame A, and is fastened at any desired depth by the set-screw $P^5$. As the post $P^3$ is set deeper into the main frame A the tension of the spring $P^4$ will be increased, and vice versa. Therefore the degree of pressure exerted by the presser P is governed by the strength of the spring $P^4$ and the depth to which the post $P^3$ is set within the main frame A.

The nose-piece $O^6$ of my device does not differ essentially from this element in machines of a similar nature to the one here described. It may be of any suitable construction.

I have provided in my machine a peculiar pincher. It is composed of a body, R. This may be hollow, and into the rear end of it fits the clamping-screw $R^1$. This screw is provided with a plain cylindrical end, conically pointed, which plain end engages between the rear fingers of the pincher $R^2$. These fingers are jointed and pivoted into the forward end of the body R. A spring, $R^3$, operates to open the fingers $R^2$ when the action of the screw $R^1$ is released; but when the conical end of the screw $R^1$ engages with the pincher-fingers $R^2$ it operates to close the parts projecting beyond the body R, and thus to clamp and secure the plate $R^4$ held between them. Near the pinching extremities of the fingers $R^2$ is provided a lug or stop-piece, $R^5$, which serves to limit the entering motion of the nail-plate, preventing it from being placed in too far, while at the same time this lug or stop $R^5$, entering a recess, $R^6$, in an opposite finger, serves to guide the pinching mechanism.

Upon the body R, as heretofore mentioned, is provided the annular slot $r$, into which sits the lug upon the lower face of the spring-latch $O^2$. The ring $O^3$, together with its latch $O^2$, engaging with the annular slot $r$, acts as a feeder to carry forward the plate $R^4$. This function is accomplished through the fork-piece $O^4$, before mentioned, which is attached to the bar S. This bar is also provided with an armed pawl, $S^1$, which may, when required, be made to engage with the ratchet-bar $S^2$, whereby the bar S and its carrier, and consequently the plate $R^4$, can be stopped at any time without stopping any other part of the machinery, inasmuch as the engagement of the pawl $S^1$ with the ratchet-bar $S^2$ stops any forward movement of the feeding-ring $O^3$. This bar is moved forward by force of a coiled spring within a drum, $S^3$, connected to the bar S through the cord $S^4$ passing over the drum $S^3$ and the pulley $S^6$.

Instead of the spring-drum $S^3$ a suspended weight might be substituted, which would operate in the same manner. The degree of tension of the spring within the drum $S^3$ is governed by turning the arm $S^7$ one way or the other, by which the spring (one end of which is attached to the shaft and the other to the drum) is wound or unwound. The equivalent of this action upon the weight would be to add to or take from said weight, which could easily be done. I always prefer, however, the spring arrangement or its equivalent here shown, inasmuch as with this a quick, accurate, and certain delivery of the plate is assured, whereas in case of the employment of a weight this function might not at all times be so well performed. In case of the spring just mentioned the arm $S^7$ may be set at any desired point, by means of the pin $S^8$ being placed at different points to hold the arm $S^7$ in any desired position.

It will be observed that the bar S, the ratchet $S^2$, the spring-drum $S^3$, and pulley $S^6$ are all fixed upon a swinging frame, T, supported by the main frame A. The method of attachment between the frame T and the main frame is such as to permit not only of a horizontal and vertical movement to the said frame T, but is also such as to render said frame adjustable vertically and horizontally on the said frame A. The vertical and horizontal motion is imparted by the double right-angle joint connecting the bar T with the frame A; and the vertical and horizontal adjustment is provided for as follows: the vertical through the screw and nuts $T^1$; the horizontal by means of the slots $T^3$ in the journal-bracket carrying the frame T and attached to the main frame A. The post or standard supporting the entire feeding mechanism is also made doubly adjustable—that is, vertically and laterally.

It is made vertically adjustable by the post U being split, and one portion thereof provided with a slot, $U^1$, and set-screw $U^2$.

The post U, where it is connected with the feeding mechanism, is provided with a slot and set-screw. This is necessary, as the parts to which it is fixed move upon the arc of a circle as they come up or down; and this motion is accommodated by the slot and set-screw $U^3$ in the top of the post U. In order to stiffen this split post, and always keep it in line, one split face is slotted, and the other split face is provided with a lug entering this slot. This affords a bearing, which operates, as specified, to strengthen and stiffen the split post U. The foot of the post U is set in a slot, $U^4$, made on the arc of a circle concentric with the pivot upon which the swinging frame T turns. By this provision the feeding device can be presented at any desired lateral angle to the knives of the machine, while, by the provision of the split post, it can be lengthened or shortened. Said feeding device can be presented at any desired vertical angle with said knives, and this angle adjusted and fixed as desired by the mechanism shown.

Each machine should be provided with duplicate pinchers, so that while one is in the machine the other can be supplied with a fresh plate, and thereby less time be lost than though a single pincher were employed.

To enable a machine to be cared for with less trouble and expense, I provide a recess or holder, which consists of an apartment, V, for holding plates, and an apartment, $V^1$, for holding the scrap-ends of the plate which has not been used, and recesses $V^2$ $V^3$ $V^4$ $V^5$ for holding the pinchers and plate while being prepared for introduction to the machine.

The parts V to $V^5$, inclusive, may all be constructed of sheet metal. One end is attached to the main frame A, while the other is supported by a leg, W. The whole is adapted to be easily and readily removed when the apartment $V^1$ shall have become filled with scraps; and this detachable device is made sufficiently light, so that it can be easily carried to the place where the scraps should be deposited.

Operation: Power is applied to the main shaft B in any suitable manner; and in a machine constructed as shown in the drawings, the main shaft is intended to revolve in a direction toward the feeding mechanism. The cams C D E F G are so formed and adjusted as to impart to the general mechanism a variety of functions in the order and in the manner as herein specified. The plate $R^4$, from which the blanks are to be cut, whether it be for the manufacture of nails, tacks, bolts, screw-blanks, or the like, is held by the pincher R, and is made to present through the nose-piece of the feeder in the usual manner. The angle at which it is presented to the knife may be adjusted both laterally and vertically, as may be desired, by the adjusting mechanism heretofore described as being embodied in the general feeding mechanism. The spring-feed herein described operates to drive forward the plate $R^4$ whenever the knives rise sufficiently to permit of its slipping between them. The extent to which the plate is permitted to be fed is gaged by a suitable stop placed beyond or upon the movable knives. This stop I have not shown in my device, inasmuch as any suitable stop may be used. I prefer an adjustable stop, however, whereby feed movements of different extent may be gaged and determined. This stop, however, forms no part of my invention. After the plate has been received between the knives the reciprocating knives descend, and, in connection with the stationary or bed knife, impart a shearing cut, whereby the blank is separated from the plate. The head end of the blank is held between the head-knife $F^1$ and the finger $g$; and the cam F, which operates the head-knife $F^1$, is so arranged that it shall operate to carry down said head-knife to such extent that the blank shall be properly presented for being griped between the body-dies.

This griping between the dies is the next operation of my machine following the cutting of the blank and its delivery to such dies, as just described. After the blank has thus been seized the finger is made to retreat and clear a passage for the approach and operation of the hammer or heading-die $I^3$. The hammer or heading-die $I^3$, now brought into operation, forms a head upon the blank, the dies at the same time compressing it and giving shape to its body. During this operation it is held firmly in position either by the dies themselves or together with the abutment $H^1$. This abutment is made adjustable for blanks of different lengths. As soon as the hammer or heading-die $I^3$ has performed its function it retreats. The dies then separating, the discharging apparatus is called into play by the action of the cam C, whereby the finished product is cleared and discharged from the die.

While the hammer or heading-die is operating, the knives have again arisen and the plate advanced for the cutting of the next succeeding blank. It is cut from its plate and brought down for reception between the dies, as heretofore described, as the hammer retreats. As each die-blank is cut from the plate said plate is given a rotating motion, so as that the next succeeding blank shall be cut from its opposite face. Instead of a reverse or reciprocating motion being given by the feeding mechanism, an intermittent motion always in the same direction is imparted.

One important advantage which I have attained in the construction of my machine is this: that the feeding-plate $R^4$ may be arrested at any point without the stoppage of any part of the machinery. This is accomplished by throwing the arm-pawl S into engagement with its ratchet-bar, thus arresting its feeding motion at any desired point.

Another important advantage is also secured by my invention through the annular slot $r$ made in the body of the pincher. By this provision, in combination with its engaged lug of the spring-latch $O^2$, the nose-piece, through which the end of the plate passes, is enabled to present said plate properly to the cutting-knives; for if any winding or twist exists in the plates, which is a common occurrence, the twist, which otherwise causes binding at the nose-piece, is accommodated by the annular slot and spring-latch heretofore mentioned, inasmuch as the pincher is permitted to turn in either direction.

While one plate is being fed to the machine the duplicate pincher, which every machine should be provided with, may be armed with a fresh plate. For convenience in this respect I have provided the arrangement shown at V V$^1$, &c. The apartment V contains fresh plates.

When a plate has been used up in a machine its pincher is removed and replaced by one having a fresh plate. The removable pincher is placed so as to lie in the rest V$^2$ and V$^3$, while a fresh plate has previously been placed in rests V$^4$ and V$^5$. As the screw in the rear of the pincher is retracted, the fingers will open and the scrap end of the plate will drop in the apartment V$^1$, immediately after which a fresh plate is inserted between the fingers of the pincher resting in V$^4$ V$^5$.

By the arrangement V V$^1$, &c., a single attendant may easily be able to keep several machines in active operation without the loss of time which would necessarily occur if only a single pincher were provided each machine, or if no convenience existed such as I have described for the arming of the pincher.

As the apartment V$^1$ becomes filled with scrap ends it may readily be detached, and, being made of light material, be carried to any place where it is desired to deposit the scrap ends.

What I claim is—

1. In a machine for making tacks, nails, and the like, the combination, with the oscillating frame of the griping-lever, of the discharge-pin H, situated in said frame, and adjustable abutment, located in the main frame of the machine, substantially as described.

2. The combination, with the finger $g$, of the finger-bar G$^1$, the coupler $g^5$, and bracket $g^6$, substantially as described.

3. The combination, with the independent annular gear-rings M$^6$ M$^7$ and collar placed between their adjacent ends, of the racks M$^4$ M$^5$, guide-bar M$^2$, attached to the rack-frame, and guide M$^3$, substantially as described.

4. In a nail or tack machine, the combination, with racks M$^4$ M$^5$ and means, substantially as described, for reciprocating said racks, of a revolving feed-barrel, provided with annular gear-rings and means for locking said gear-rings to the said barrel as they are turned in one direction, substantially as described.

5. In a tack or nail machine, the combination, with a frame having the racks M$^4$ M$^5$ rigidly secured thereto, of a revolving feed-barrel, O, annular gear-rings M$^6$ M$^7$, provided with spring-pawls $m$ $m^1$ and ratchets or lugs $m^2$ $m^3$ upon the feed-barrel, substantially as described.

6. The combination, with the revolving barrel O, of grooved ring or collar O$^3$, fork O$^4$, spring-latch O$^2$, and plate-holder R, substantially as described.

7. The plate-holder R, consisting, essentially, in the combination of the main body of the same, of the jaws R$^2$, pivoted to the forward end of the body, and the adjusting-screw R$^1$, formed with a conical engaging-point, substantially as described.

8. The combination of the pincher R and its annular slot $r$, the feeding-collar O$^3$, the latch O$^2$, and nose-piece O$^6$, substantially as described.

9. In a machine for making tacks, nails, and the like, the combination, with the oscillating frame, of the discharging-pin H, pin $h^1$, cam C, bell-crank C$^1$ C$^2$, connecting-rod $c'$, and adjustable abutment H$^1$, substantially as described.

10. The combination of the presser P, telescope-arm P$^1$ P$^2$, and post P$^3$, substantially as described.

11. The combination, with the presser P, swiveled to the longitudinally-adjustable arm P$^1$, of the hinged bar P$^2$, standard P$^3$, and spring P$^4$, substantially as described.

12. The combination, with the rotary feeding-collar O$^3$, forked carrier O$^4$, and slide connected to a spring by a cord, of the ratchet-bar S$^2$ and pawl S$^1$, substantially as described.

13. The combination of collar O$^3$, forked carrier O$^4$, bar S, pawl S$^1$, and ratchet-bar S$^2$, substantially as described.

14. The combination of the hammer or heading-die I$^3$ and two-part clamp or socket I$^2$ with the supporting-wedge and locking-plate D$^3$, substantially as described.

15. The combination, with the bell-crank lever L$^3$ and suitable actuating mechanism, of the divided rod L$^4$, adjusting-nut L$^5$, bell-crank lever M, racks M$^4$ M$^5$, and annular gear-rings on the revolving feed-barrel O, substantially as described.

16. The combination, with the bell-crank lever M and means for actuating the same, of the racks M$^4$ M$^5$, gear-rings M$^6$ M$^7$, guide M$^3$, bar M$^2$, and link M$^1$, substantially as described.

17. The combination, with the plate-holder R, provided with an adjusting-screw, R$^1$, and annular groove $r'$, of a revolving barrel, O, collar O$^1$, and spring-latch O$^2$, substantially as described.

18. The finger-bar G$^1$, journaled on the point or pivot in line with the axis of the hammer or heading-die, substantially as described.

19. The finger-bar G$^1$, in combination with springs $g^1$ $g^2$, substantially as described.

20. In combination with the feeding mechanism of a machine for making tacks, nails, screw-blanks, and the like, the apartments $v$ $v^1$, rests $v^2$ $v^3$ $v^4$ $v^5$, all contained in a single frame or structure, said structure being made readily detachable from the main frame A, substantially as described.

21. The combination of the beveled knife K, its counter-bevel seat, and the stationary die $K^1$, whereby said die is held down firmly in position, substantially as described.

In testimony whereof I have signed my name to this specification in the presence of two subscribing witnesses.

JASON A. BIDWELL.

Witnesses:
FRANCIS TOUMEY,
WILLIAM BEHRENS.